US008176256B2

(12) United States Patent  (10) Patent No.: US 8,176,256 B2
Krishnaprasad et al.  (45) Date of Patent: May 8, 2012

(54) CACHE REGIONS

(75) Inventors: Muralidhar Krishnaprasad, Redmond, WA (US); Anil K. Nori, Redmond, WA (US); Subramanian Muralidhar, Bellevue, WA (US); Sudhir Mohan Jorwekar, Hyderabad (IN); Lakshmi Suresh Goduguluru, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 12/465,667

(22) Filed: May 14, 2009

(65) Prior Publication Data

US 2009/0313436 A1 Dec. 17, 2009

Related U.S. Application Data

(63) Continuation-in-part of application No. 12/363,505, filed on Jan. 30, 2009.

(60) Provisional application No. 61/061,017, filed on Jun. 12, 2008.

(51) Int. Cl.
G06F 12/08 (2006.01)
(52) U.S. Cl. ........ 711/129; 711/141; 711/154; 711/173; 711/153; 711/130
(58) Field of Classification Search .................. 711/129, 711/141, 154, 173, 153, 118, 130, 133
See application file for complete search history.

(56) References Cited

U.S. PATENT DOCUMENTS

| | | | |
|---|---|---|---|
| 5,220,604 A | 6/1993 | Gasser et al. | |
| 5,261,069 A | 11/1993 | Wilkinson et al. | |
| 5,548,506 A | 8/1996 | Srinivasan | |
| 5,634,053 A | 5/1997 | Noble et al. | |
| 5,734,898 A | 3/1998 | He | |
| 5,878,218 A | 3/1999 | Maddalozzo, Jr. et al. | |
| 6,321,240 B1 | 11/2001 | Chilimbi et al. | |
| 6,341,311 B1 | 1/2002 | Smith et al. | |
| 6,901,410 B2 | 5/2005 | Marron et al. | |
| 6,973,546 B2 | 12/2005 | Johnson | |
| 7,249,219 B1 | 7/2007 | Mowat et al. | |
| 7,457,918 B2 | 11/2008 | Marwinski et al. | |
| 7,464,400 B2 | 12/2008 | Jindani et al. | |
| 7,698,239 B2 | 4/2010 | Lieuallen et al. | |

(Continued)

FOREIGN PATENT DOCUMENTS

EP 0926608 B1 10/2004

(Continued)

OTHER PUBLICATIONS

Guyer, et al., "Finding Your Cronies:Static Analysis for Dynamic Object Colocation" Retrieved at <<http://www.cs.utexas.edu/~sammy/cronies-oopsla-2004.pdf>> In the proceedings of the 19th annual ACM SIGPLAN conference on Object-oriented programming, systems, languages, and applications, Oct. 24-28, 2004, pp. 14.

(Continued)

*Primary Examiner* — Thong Q Le
(74) *Attorney, Agent, or Firm* — Jared S. Goff

(57) ABSTRACT

A cache region can be created in a cache in response to receiving a cache region creation request from an application. A storage request from the application can identify the cache region and one or more objects to be stored in the cache region. Those objects can be stored in the cache region in response to receiving the storage request.

19 Claims, 14 Drawing Sheets

U.S. PATENT DOCUMENTS

| | | | |
|---|---|---|---|
| 2001/0028364 | A1 | 10/2001 | Fredell et al. |
| 2002/0178119 | A1 | 11/2002 | Griffin et al. |
| 2003/0041214 | A1 | 2/2003 | Hirao et al. |
| 2003/0041215 | A1 | 2/2003 | George et al. |
| 2003/0187821 | A1 | 10/2003 | Cotton et al. |
| 2004/0153576 | A1 | 8/2004 | Hansmann et al. |
| 2004/0221105 | A1 | 11/2004 | Fujimoto et al. |
| 2005/0097440 | A1 | 5/2005 | Lusk et al. |
| 2005/0223028 | A1 | 10/2005 | Geiner et al. |
| 2006/0074894 | A1 | 4/2006 | Remahl et al. |
| 2006/0143685 | A1 | 6/2006 | Vasishth et al. |
| 2006/0248124 | A1* | 11/2006 | Petev et al. .................. 707/201 |
| 2007/0055887 | A1 | 3/2007 | Cross et al. |
| 2007/0198478 | A1 | 8/2007 | Yu |
| 2007/0208713 | A1 | 9/2007 | Krishnaprasad et al. |
| 2007/0226421 | A1 | 9/2007 | Hoang et al. |
| 2007/0233539 | A1 | 10/2007 | Suenderhauf et al. |
| 2007/0283443 | A1 | 12/2007 | McPherson et al. |
| 2008/0052102 | A1 | 2/2008 | Taneja et al. |
| 2008/0147988 | A1* | 6/2008 | Heller et al. .................. 711/141 |
| 2008/0244736 | A1 | 10/2008 | Lampson et al. |
| 2009/0043881 | A1 | 2/2009 | Alstad |
| 2009/0044259 | A1 | 2/2009 | Bookman et al. |
| 2009/0049312 | A1 | 2/2009 | Min |
| 2009/0150511 | A1 | 6/2009 | Gross et al. |
| 2009/0300154 | A1 | 12/2009 | Branson et al. |

FOREIGN PATENT DOCUMENTS

| | | |
|---|---|---|
| EP | 1647908 | 4/2006 |
| WO | 2009000276 | 12/2008 |

OTHER PUBLICATIONS

Bortvedt Jerry, "Functional Specification for Object Caching Service for Java (OCS4J), 2.0", Retrieved at <<http://jcp.org/aboutJava/communityprocess/jsr/cacheFS.pdf>> Aug. 9, 2000, pp. 1-27.

"GemFire Architectural Overview", Undated but believed to have been retrieved at <<http://developer.gemstone.com/display/gfedev/Topologies+and+Architectures+for+Middle-Tier+Caching>> in about Feb. 2009, pp. 7.

"General Concepts (Velocity)" Retrieved at <<http://msdn.microsoft.com/en-us/library/dd169078(printer).aspx>> Feb. 9, 2009, pp. 7.

"Java Object Cache" Retrieved at <<http://www.deakin.edu.au/its/dba/oracle-doco/9.0.4.1/9.0.4_doc_library/web.904/b10326/objcache.htm>> Feb. 9, 2009, pp. 1-44.

"GemFire Enterprise Architectural Overview Release 5.0" Retrieved at <<http://www.gemstone.com/pdf/GemFire_Architecture.pdf>> Copyright Date 2006, pp. 72.

Chirkova, et al. "Cache Invalidation and Propagation in Distributed Caching", Retrieved at<<ftp://ftp.ncsu.edu/pub/unity/lockers/ftp/csc_anon/tech/2005/TR-2005-07.pdf>>, 2005, pp. 1-39.

Cao, et al. "Data Consistency for Cooperative Caching in Mobile Environments", Retrieved at<<http://ieeexplore.ieee.org/stamp/stamp.jsp?arnumber=04160225>>, Published by the IEEE Computer Society, 2007 IEEE, pp. 7.

Kohli, et al. "Cache Invalidation and Update Propagation in Distributed Caches", Retrieved at<<http://dbgroup.ncsu.edu/rychirko/Papers/KohliC05.pdf>>, Jun. 2005, pp. 5.

Franklin, et al."Transactional Client-Server Cache Consistency: Alternatives and Performance", Retrieved at<<http://www.cs.binghamton.edu/~shadi/cmp/papers/tcscc.pdf>>, ACM Transactions on Database Systems, vol. 22, No. 3, Sep. 1997, pp. 49.

"Intelligent Caching", Retrieved at <<http://www.alachisoft.com/ncache/intelligent_cache.html>>, copyright notice 2008, pp. 3.

"Oracle9iAS TopLink CMP for Users of BEA WebLogic Guide", Retrieved at <<http://download-uk.oracle.com/docs/cd/A97688_16/toplink.903/b10065/clusteri.htm>> on Mar. 19, 2009, Part No. B10065-01, pp. 6.

Yang, Jiong; Nittel, Sylvia; Wang, Wei; Muntz, Richard. "DynamO: Dynamic Objects with Persistent Storage," Department of Computer Science, University of California, Los Angeles, California. Retrieved online at [http://www.cs.unc.edu/~weiwang/paper/pos98.ps] on Jul. 21, 2008.

"Microsoft Project Codename 'Velocity,'" retrieved online at [http://download.microsoft.com/download/a/1/5/a156ef5b-5613-4e4c-8d0a-33c9151bbef5/Microsoft_Project_Velocity_Datasheet_.pdf] on Jul. 21, 2008.

Berardi, Nick. "Posts Tagged 'Distributed Cache'," The Coder Journal, retrieved online at [http://www.coderjournal.com/tags/distributed-cache/] on Jul. 22, 2008.

Decoro, Christopher; Langston, Harper; Weinberger, Jeremy. "Cash: Distributed Cooperative Buffer Caching," Courant Institute of Mathematical Sciences, New York University. Retrieved online at [http://cs.nyu.edu/~harper/papers/cash.pdf] on Jul. 21, 2008.

Krishnaprasad Muralidhar, "Distributed Cache Arrangement", MS324850.02 (MSFTP2377USA), Filed on Jan. 30, 2009, pp. 35.

Bhatti, et al. "Evaluation of Different Open Source Identity Management Systems", Retrieved at <<http://www.ida.liu.se/-TDDD171oldprojects/2007/projects/13.pdf>>, 2007, 11 pages.

Guru, et al. "A Template-Based Conceptual Modeling Infrastructure for Simulation of Physical Security Systems", Retrieved at <<http://www.informs-sim.org/wsc04papers/109.pdf>>, Proceedings of the 2004 Winter Simulation Conference, 2004, pp. 866-873.

International Search Report dated Dec. 30, 2009, for PCT Application Serial No. PCT/US2009/044259, 11 pages.

Office Action, U.S. Appl. No. 12/363,505, Filed Jan. 30, 2009, Notification Date: Jul. 22, 2011, p. 19.

Office Action, U.S. Appl. No. 12/363,505, Filed Jan. 30, 2009, Notification Date: Dec. 19, 2011, p. 17.

European Search Report, Application No. 09763165.9 —1229, Reference EP72967TE900kap, Date: Jan. 16, 2012, p. 7.

Office Action. U.S. Appl. No. 12/465,677, Filed May 14, 2009, Notification Date: July 14, 2011, p. 20.

* cited by examiner

CACHE REGIONS

CROSS-REFERENCE TO RELATED APPLICATIONS

This application is a continuation-in-part of U.S. application Ser. No. 12/363,505 filed on Jan. 30, 2009 entitled "DISTRIBUTED CACHE ARRANGEMENT," and the entirety of that application is hereby incorporated by reference. This application also claims the benefit of U.S. Provisional Application No. 61/061,017 filed on Jun. 12, 2008 entitled "DISTRIBUTED CACHE", and the entirety of that application is hereby incorporated by reference.

BACKGROUND

A continuing problem in computer systems remains handling the growing amount of available information or data. The sheer amount of information being stored on disks or other storage media for databases in some form has been increasing dramatically. While files and disks were measured in thousands of bytes a few decades ago—at that time being millions of bytes (megabytes), followed by billions of bytes (gigabytes)—now databases of a million megabytes (terabytes) and even billions of megabytes are being created and employed in day-to-day activities.

With the costs of memory going down, considerably large caches can be configured on the desktop and server machines. In addition, in a world where hundreds of gigabytes of storage is the norm, the ability to work with most data in large caches can increase productivity and efficiency because the caches can be configured to retrieve data more quickly than the same data can be retrieved from many mass data stores. A cache is a collection of data that duplicates original value(s) stored elsewhere or computed earlier, where the cached data can be read from the cache in lieu of reading the original value(s). A cache is typically implemented where it is more efficient to read the cached data than to read the original value(s) so that use of the cache can increase the overall efficiency of computing systems.

In an effort to scale the size of caches in an organized manner, some caches are structured as distributed partitioned caches. A distributed cache is a cache that is distributed across one or more cache nodes. Typically, a distributed cache is distributed across one or more physical or virtual computing machines. A distributed partitioned cache is a cache that is partitioned across multiple cache nodes. As used herein, a node refers to a storage process in a cache storage system. A node may be on a single machine or spread across multiple physical machines, and a single physical machine may include multiple storage nodes, such as where a single physical machine hosts multiple virtual machine processes. Thus, the distributed partitioned cache is spread over multiple storage processes, so that the entire set of primary cache data to be read is not stored on a single process, and typically is not stored on a single machine. As used herein, the term "primary" cache data indicates the data that is currently set up to be accessed, such as to be read from the cache, as opposed to secondary or replicated data that is currently being stored as a backup. The primary data may also be replicated from other data outside the data store. For example, in a distributed cache the primary data may be replicated from more authoritative data that is stored in long-term mass storage. The term "primary" is similarly used to refer to a primary region, which is a region currently set up to be accessed, as opposed to a replica of the primary region. The term "primary" can also be used to refer to a primary node, which is a node that stores the primary cache data, such as a primary region. Note, however, that a cache node can be a primary node for one set of cache data and a secondary node for another set of cache data. A distributed partitioned cache system is a system that is configured to implement distributed partitioned caches.

SUMMARY

Whatever the advantages of previous caching tools and techniques, they have neither recognized the cache region tools and techniques described and claimed herein, nor the advantages produced by such tools and techniques.

In one embodiment, the tools and techniques can include receiving a cache region creation request at a distributed partitioned cache system that includes a distributed partitioned cache. A cache region of the cache can be created in response to receiving the request. The cache can be spread over a plurality of cache nodes, but the entire cache region can be stored in one of the nodes.

In another embodiment of the tools and techniques, a cache region can be created in a cache in response to receiving a cache region creation request from an application. A storage request from the application can identify the cache region and one or more objects to be stored in the cache region. Those objects can be stored in the cache region in response to receiving the storage request.

In yet another embodiment of the tools and techniques, a cache can be created in a cache system, and a cache region can be created in the cache. A plurality of cache items can be stored in the cache region. In response to receiving a cache region operation request that identifies the cache region, the cache system can operate on the cache region.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
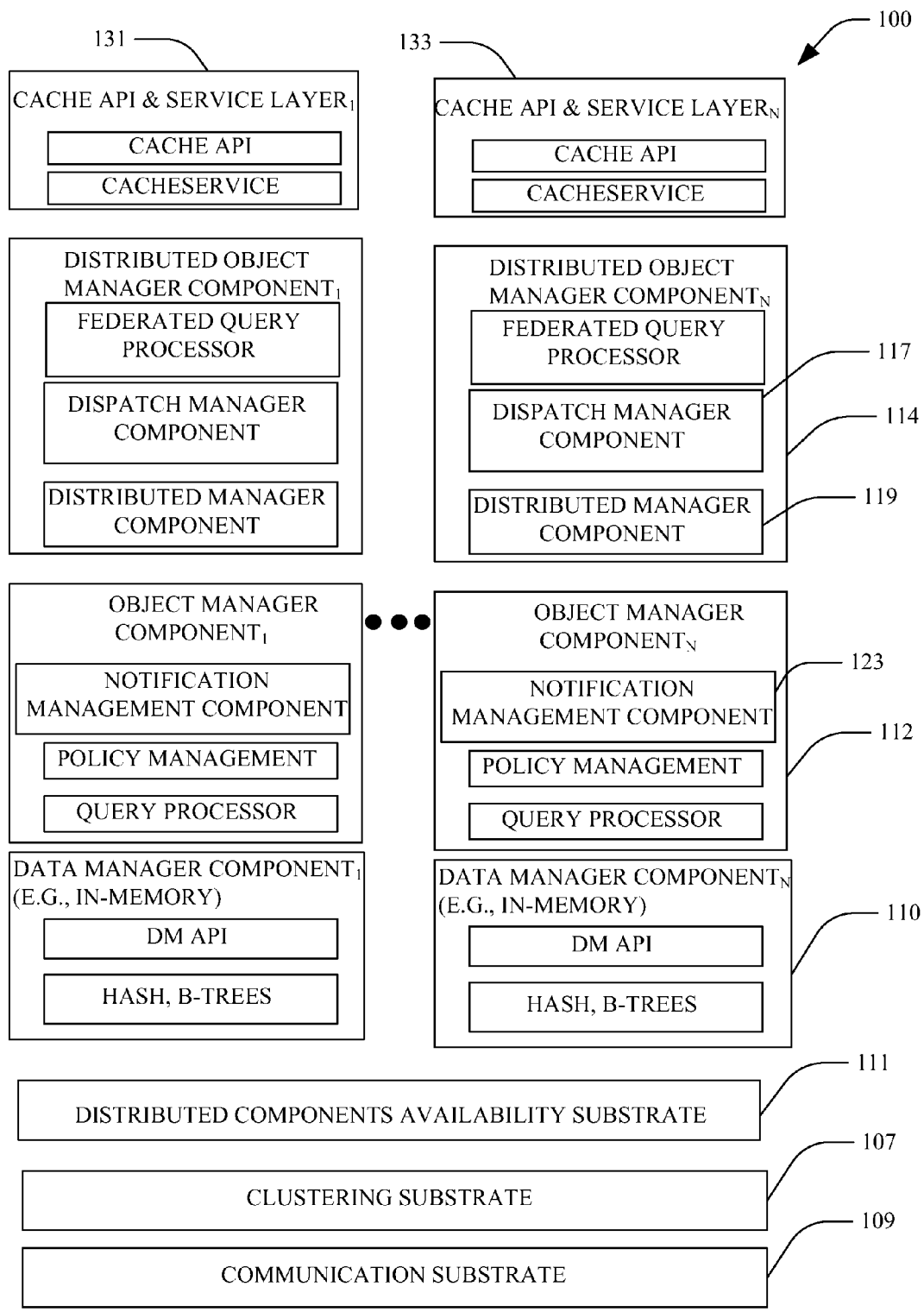
FIG. 1 illustrates an exemplary layering arrangement.

Described embodiments are directed to techniques and tools for improved caching of computer information. Such improvements may result from the use of various techniques and tools separately or in combination.

The techniques and tools described herein can include using cache regions in a cache system, such as a distributed partitioned cache system. A cache region can include one or more cache items (also referred to herein as a cache object). A cache item includes a value, which is the data to be stored in the cache, and at least one associated identifier, such as a hash key, which can be used to identify the item. A region may also include an associated identifier, such as a hash key, to identify the region. The regions can be nested so that a region can include one or more cache items and/or one or more sub-regions, and the sub-regions can in turn include one or more cache items and/or one or more sub-regions. A cache can include one or more regions, and a cache system can include one or more caches. Each cache can include an associated identifier, such as a cache name. Each cache, cache region, and cache item may include associated metadata in addition to an associated identifier, such as tags or other metadata specifying how the corresponding cache, region, or item is to be handled by the cache system.

The use of such cache regions can provide increased efficiency in implementing and managing caches, such as distributed partitioned caches. For example, an application may want to store information for an on-line shopping cart in the cache. It can be useful to operate on single items in the shopping cart, such as representations of purchase items that have been selected by an on-line user. For example, a user may want to add or remove a single item from the shopping cart, and it can be more efficient to remove or add a single item than to replace the entire shopping cart in the cache. However, some operations on the shopping cart can be more efficient they are applied to the entire shopping cart. For example, at the end of an on-line session, it may be useful to delete the entire shopping cart from the cache. The shopping cart can be stored as a shopping cart cache region, and the shopping cart items can be stored as cache items in that region. Accordingly, operations can be done on the shopping cart items by making calls to operate on the particular corresponding cache items (e.g., create, read, update, delete). In addition, operations can be done on the entire shopping cart by making calls to operate on the shopping cart region as a whole (e.g., create, read, update, delete), rather making a separate call for each item in the shopping cart. Accordingly, the use of cache regions can provide increased efficiency and flexibility. However, neither the claims below nor the techniques discussed herein are limited to increased efficiency, flexibility, or other benefits described herein.

I. General Information Storage and Caching

Increasing advances in computer technology (e.g., microprocessor speed, memory capacity, data transfer bandwidth, software functionality, and the like) have generally contributed to increased computer use in various industries. Ever more powerful server systems, which are often configured as an array of servers, are often provided to service requests originating from external sources such as the World Wide Web, for example.

Various forms of storage devices allow information to be held over relatively a long period without information degradation. A common storage medium is flash memory; specifically, flash memory is a non-volatile form of storage that retains information without drawing upon a constant source of power. Such type of memory is often employed in a variety of consumer electronic devices such as memory cards, universal serial bus (USB), flash drives, personal data assistants (PDAs), digital audio players, digital cameras, mobile phones, and so forth.

Another common type of non-volatile storage medium is a magnetic disk, which enables information to be recorded according to a magnetization pattern. Similar to other storage media, magnetic disks can be configured in a variety of manners (e.g., Magneto resistive Random Access Memory) as well as employed in many different applications. This type of storage device is commonly used in connection with databases and analog recordings. Likewise, volatile forms of storage media exist that provide certain benefits that may also be accompanied by particular disadvantages. For example, retrieval times for volatile media are generally faster than that for non-volatile media, and many operations have increased uniformity due to well-established standards.

Moreover, today applications run on different tiers, in different service boundaries, and on different platforms (e.g. server, desktop, devices). For example, in a typical web application, many applications reside on a server supporting a large number of users; however, some client components of the application may run on desktops, mobile devices, and web browsers, and the like. Furthermore, advances in connectivity and cheap storage, combined with the complexity of software management, facilitate on-line services and software-as-a-service. In such services models, applications (and associated data) are typically hosted in central data centers (also sometimes referred to as the "cloud") and are accessible and shared over the web.

The distributed applications may be accompanied by a large number of users, high performance, high throughput and fast response time. With such services orientation it may be desirable for the cost of service to be low, thereby making low-cost scalability and performance desirable as well.

A further challenge in implementing storage systems is support for distribution and heterogeneity of data and applications. Applications are composing (e.g. mashups) data and business logic from sources that can be local, federated, or cloud-based. Composite applications may use aggregated data that is shaped in a form that is most suitable for the application. Data and logic sharing is also a feature of many composite applications.

As explained earlier, data and applications can reside in different tiers with different semantics and access patterns. For example, data in back-end servers/clusters or in the cloud tends to be authoritative; data on the wire is message oriented; data in the mid-tier is either cached data for performance or application session data; data on the devices could be local data or data cached from back-end sources. With the costs of memory going down, considerably large caches can be configured on the desktop and server machines. With the maturity of 64-bit hardware, 64-bit CPUs are becoming mainstream for client and server machines. True 64-bit architectures support 64-bit CPUs, data or address buses, virtual addressability and dramatically increase memory limits (to bytes). Operating systems (e.g. Windows, Linux) are also upgraded to support and take advantage of 64 bit address-space and large memories. For example, desktops can be configured with 16 GB RAM, and servers can be configured with up to 2 TB of RAM. Large memory caches can allow for data to be located close to the application, thereby providing significant performance benefits to applications. In addition, in a world where hundreds of gigabytes of storage is the norm, the ability to work with most data in memory (large caches) and easily shift from tables to trees to graphs of objects can be beneficial for programmer productivity for next generation applications.

II. General Cache Layering Arrangement

The memory capacity of multiple computers or processes can be aggregated into a single unified cache, which can be scalable (e.g., a dynamic scaling) to a plurality of machines via a layering arrangement. Such layering arrangement can cache serializable Common Language Runtime (CLR) objects and provide access through a simple cache application programming interface (API). The layering arrangement can include a data manager component, an object manager component and a distributed object manager component, which can be implemented in a modular fashion. In one aspect, the data manager component supplies basic data functions (e.g., hash functions), and the object manager component implements object facade thereon including cache objects—while the distributed object manager provides distribution of the data in the distributed cache.

As such, the object manager component can map regions to containers and manage data eviction thresholds and supply policy management for cached data. Such regions can represent cache containers that typically guarantee co-locations of the object placed/inserted in the container (e.g., co-locations of objects in same node). Additionally, the object manager component can raise notifications (e.g., due to changes made to cached data) for various regions or objects of the distributed cache. Likewise, the distributed object manager component can dispatch requests to various nodes associated with different regions of the distributed cache.

Moreover, the distributed object manager can interface with partition maps of the distributed cache for a given request, and can facilitate abstraction of the aggregated cache in the distributed environment, to a single unified cache. In one aspect, the distributed object manager component is positioned on top of the object manager component, which itself is placed on top of the data manager component. Moreover, tight integration can be provided with ASP.NET to enable cache ASP.NET session data in the cache without having to write it to source databases, for example.

These components can provide pluggable features that can readily adapt to a user's preferences (e.g., replacing a data manger component with another type thereof, based on user preferences). Likewise, the object manager component can be replaced with another object manager component, wherein plugging different models in the layering arrangement is enabled by enabling a call back mechanism with holding locks during call back throughout the stack.

In a related aspect, the layering arrangement can provide for a modular arrangement that facilitates operation on different levels and communication substrates (e.g., TCP/IP), and which can be implemented in two topology models, namely as an independent separate tier model or an embedded application model. In the independent and separate tier model, the caching layer can function as an independent separate tier by itself (which can be positioned between application servers and data servers). For example, in such a configuration the distributed cache can run as a service hosted either by Windows Activation Services (WAS) or windows service, and can run separate from the application. The applications can either employ the client stubs provided by the distributed cache to talk thereto, or can communicate through a representational state transfer (REST) API directly into the service.

Alternatively, in the embedded application model the cache can be embedded within the application itself (e.g., connecting the applications together to form a cluster—such as embedding caches in ASP.net instances to form a cluster of ASP.net machines, wherein upon storing an item in a local cache it can be viewed from other machines.) This embedding can further enable tagging and Language Integrated Query (LINQ) queries on the objects from a functionality perspective. LINQ queries can then be run natively on stored objects, and can be embedded in .Net applications.

The various aspects of the described tools and techniques will now be described with reference to the annexed drawings, wherein like numerals refer to like or corresponding elements throughout. However, the drawings and detailed description relating thereto are not intended to limit the claimed subject matter to the particular form disclosed. Rather, the intention is to cover all modifications, equivalents and alternatives falling within the spirit and scope of the claimed subject matter. For example, cache regions may be implemented in an arrangement other than the disclosed layering arrangement.

III. Cache System & Tools

A. Cache Layering

FIG. 1 illustrates an exemplary layering arrangement that can enable aggregating memory capacity of multiple computers into a single unified cache. Such layering arrangement (100) can provide for a scalable system that can be tailored to different types of communication layers such as TCP/IP, and pluggable features can be further enabled for readily adapting to a user's preferences. The distributed cache system implementing the layering arrangement (100) can dynamically scale itself with growth of applications associated therewith, by addition of additional computers or storage processes as nodes to a cluster of machines and/or storage processes. As illustrated in FIG. 1, each of the cache nodes (131, 133) (1 to n, n being an integer) of the layering arrangement (100) can include a data manager component (110), an object manager component (112) and a distributed object manager component (114), the set up of which can be implemented in a modular fashion. The distributed object manager component (114) can be positioned on top of the object manager component (112), which can be placed on top of the data manager component (110). The data manager component (110) can supply basic data functions (e.g., hash functions), and the object manager component (112) can implement object facade thereon including cache objects, with the distributed object manager component (114) providing the distribution. As such, the object manager component (112) and data manager component (110) can act as local entities, wherein the distributed object manager component (114) can perform distributions.

Moreover, a clustering substrate (107) can establish clustering protocols among a plurality of nodes that form a single unified cache. For example, when a node is to join or leave the cluster, requisite operations for adding or leaving the cluster can be managed, wherein a distributed components availability substrate (111) can employ such information to manage operations (e.g., monitoring health of nodes, managing life cycles of nodes, creating a primary node on another machine). In addition, for each node, each of the components forming the layering arrangement can be pluggable based on user preferences, system features, and the like.

As explained earlier, the data manager component (110) (e.g., in memory) can provide primitive high performance data structures such as hash tables, Btrees, and the like. Since the data manager component (110) can be memory bound and all operations of the distributed cache can be atomic, the data manager component (110) can typically implement highly concurrent hash tables. The data manager component (110) and the hash table structures can further facilitate creating the infrastructure for supplying containers and indexes on containers. In addition, the data manager component (110) can provide simple eviction and expiration on these hash structures. Due to pluggable features supplied by the layering arrangement (100), users can plug in different types of data managers tailored to users' preferences, such as a transaction data manager or a disk paged data manager, or the like. Likewise, the object manager component (112) can provide object abstraction and can implement the concept of named caches and regions by employing data structures provided by the data manager component (110).

Similarly, the distributed object manager component (114) can employ the local object manager component (112) and integrate with the distributed components availability substrate (111) to provide the abstraction of the distributed cache. The distributed components availability substrate (111) can provide the transport and data consistency operations to make the system scalable and available. The distributed object manager component (114) can optionally be implemented as part of a client tier to facilitate dispatching requests (e.g., directly) to the nodes associated with the single unified cache.

In one particular aspect, the distributed object manager component (114) can further include a dispatch manager component (117) and a distributed manager component (119). The dispatch manager component (117) can further look up the routing table to dispatch the requests to a primary node (e.g., where a primary region is located) as part of a dynamically scalable distributed cache. Moreover, the dispatch manager component (117) can also be present in the client so that the client can directly dispatch requests to the primary node. For example, the distributed object manager component (114) on the receiving node can interact with a partition map to check if the node is indeed designated as the primary node as part of a plurality of nodes associated with the distributed cache, and can call the object manager component (112) to perform the operation. In the case of write operations, the distributed object manager component (114) can also communicate with a replicator to replicate the data to the secondary nodes. The distributed object manager component (114) can also interact with failover manager systems (not shown) to clone regions to create new secondary or primary nodes during reconfiguration procedures subsequent to possible failures.

The object manager component (112) can further include a notification management component (123) that can track changes to regions and objects, and can relay notifications to delegates listening to those events. Moreover, applications can also register delegates for notifications on any node which may be different from the primary node on which the object resides. The distributed object manager component (114) can further manage the propagation of notifications in a distributed fashion including providing high availability for such notifications when the primary node fails. For example, this can be handled by maintaining a local lookup table indexed by delegate id on the node where the application registers the delegate. The primary node that stores the object can maintain the delegate id and the originating node information. When an object changes, the distributed object manager component (114) of the primary node can notify all the originating nodes, passing along the delegate id.

Similarly, the distributed object manager component (114) associated with the receiver can employ the lookup table to call the appropriate delegate, thus providing the change information to the application in a distributed fashion. For example, notifications can be asynchronous and can further be backed up using the same secondary nodes. Accordingly, in the event of failures, the secondary nodes can attempt to deliver the pending notifications, wherein in the event of primary node failure, notifications can be resent because the primary node may not have synchronized the information regarding the delivered notifications before failure. Since all notifications can carry the region, key and version information, the application can use the version to ignore duplicate notifications. Following are some examples of callback syntax.

Example—Region Level Callback

```
public delegate CacheCallback
elec_cbk = new CacheCallback( myclass.handler );
catalog.addCallback("ElectronicsRegion", elec_cbk);
Callback called for any updates to region
```

Example—Object Level Callback

```
public delegate CacheItemRemovedCallback
elec_cbk = new CacheItemRemovedCallback( );
// Add the callback to the object ; the elec_cbk delegate will be called
// whenever the object changes regardless of where the object is present
catalog.Add("ElectronicsRegion", "key", object, elec_cbk);
```

The availability substrate (111) can provide scalability and availability to systems that contain a storage component associated with the distributed cache. For example, the availability substrate can include load balancers, fail over managers, replicators and the like. A communication substrate (109) can provide for failure detection of nodes and reliable message delivery between nodes. The communication substrate (109) can interact with the availability substrate (111). Moreover, the communication substrate (109) can also provide the communication channels and cluster management. The communication substrate (109) can provide callbacks whenever a new node joins the cluster or when a node dies or fails to respond to exchanged messages (e.g., heart beat messages). Moreover, the communication substrate (109) can provide efficient point-to-point and multicast delivery channels, and can further provide reliable message delivery for implementing replication protocols. For example, the communication substrate (109) can support notifications by maintaining delegate information in cache items and triggering the notification when items are modified. The communication substrate (109) can also trigger eviction based on policies defined at the region or named cache level.

B. Cache Topology

Figure 2:
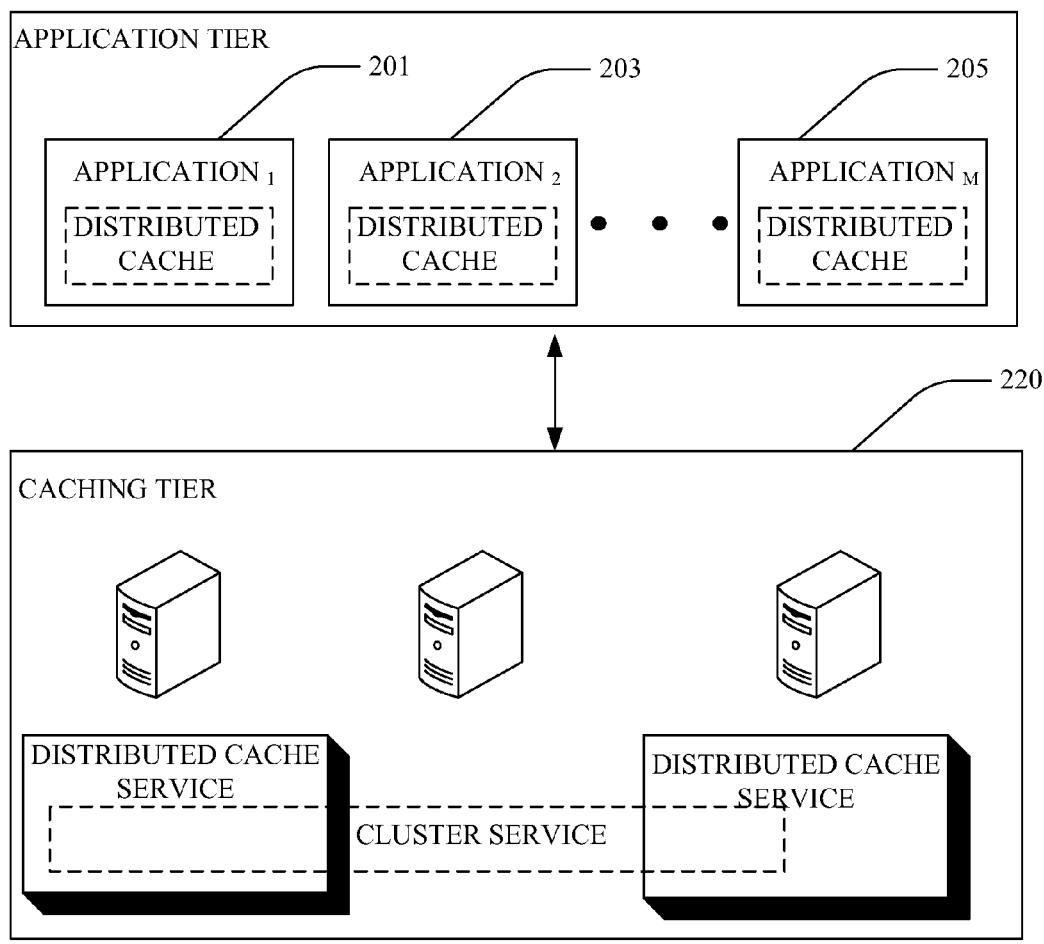
FIG. 2 illustrates a further topology model of a layering arrangement that relates to an independent separate tier model implementation.
Figure 3:
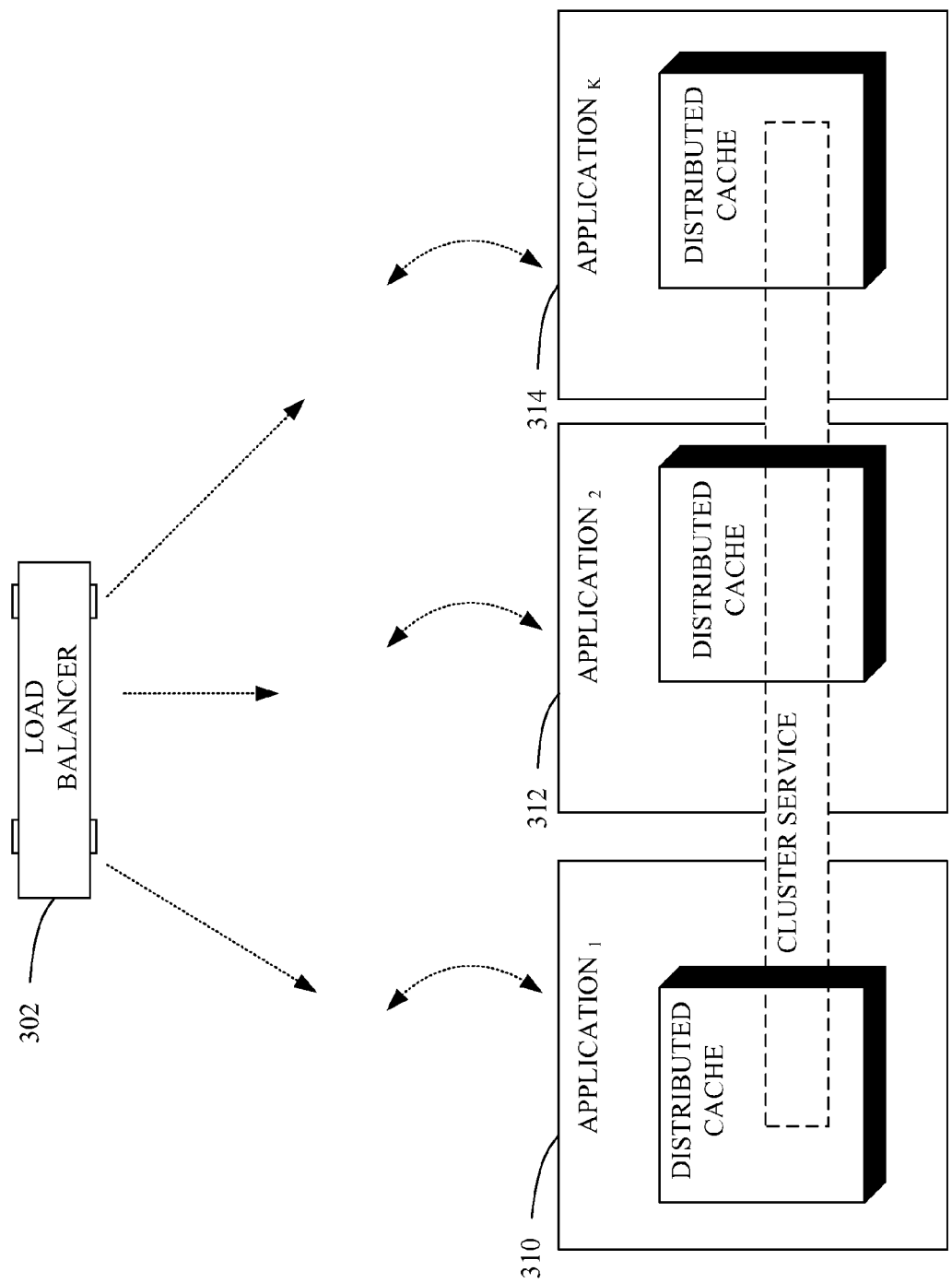
FIG. 3 illustrates a topology model of a layering arrangement that pertains to an embedded application model.

FIG. 2 and FIG. 3 illustrate two topology models, namely an independent separate tier model, and an embedded application model, respectively. According to one particular aspect, in the independent and separate tier model of FIG. 2, the caching tier (220) can function as an independent separate tier by itself (which can be positioned between application servers and data servers). For example, in such configuration the distributed cache system can run as a service hosted either by WAS or windows service and can run separate from the application. The applications (201, 203, 205) (1 to m, m being an integer) can either employ the client stubs provided by the distributed cache to communicate with the cache system, or can communicate directly into the service, such as through a representational state transfer (REST) API.

Alternatively, in the embedded application model the cache system can be embedded within the application itself as illustrated in FIG. 3. Such can occur by connecting the applications (310, 312, 314) (1 to k, k being an integer) together to form a cluster; for instance as embedding caches in ASP.net instances to form a cluster of ASP.net machines, wherein upon storing an item in a local cache it can be viewed from other machines. For example, the distributed cache runtime dlls can be compiled with the application and the application can act as the cache host for the distributed cache runtime. All the thread pools and memory can come from the application's container.

In a related aspect, a Load Balancer (302) can dynamically redistribute load across the cluster in the event that one or more nodes are inundated. For example, data can be repartitioned to spread it to nodes that have less loads. All such nodes can periodically send their load status as part of the configuration metadata. The load balancer (302) can also periodically query the configuration to determine which nodes are overloaded and can be balanced. For example, distributing the load may include repartitioning the overloaded partition of data on a primary node and spreading the overloaded partition to one (or more) of its secondary nodes. This may involve only a change in the configuration data (partition map) and no data movement (since the secondary nodes already have the data). In other scenarios, the data may be distributed to other non-secondary nodes since the secondary nodes themselves might be loaded and cannot handle the additional load. In such cases, either the data partitions on the secondary nodes (for which this node is the primary) can be further load balanced; or non-secondary nodes can be chosen to distribute the load, in which case in addition to the changes in the partition map, data can be moved.

C. Distributed Cache Structure with Regions

Figure 4:
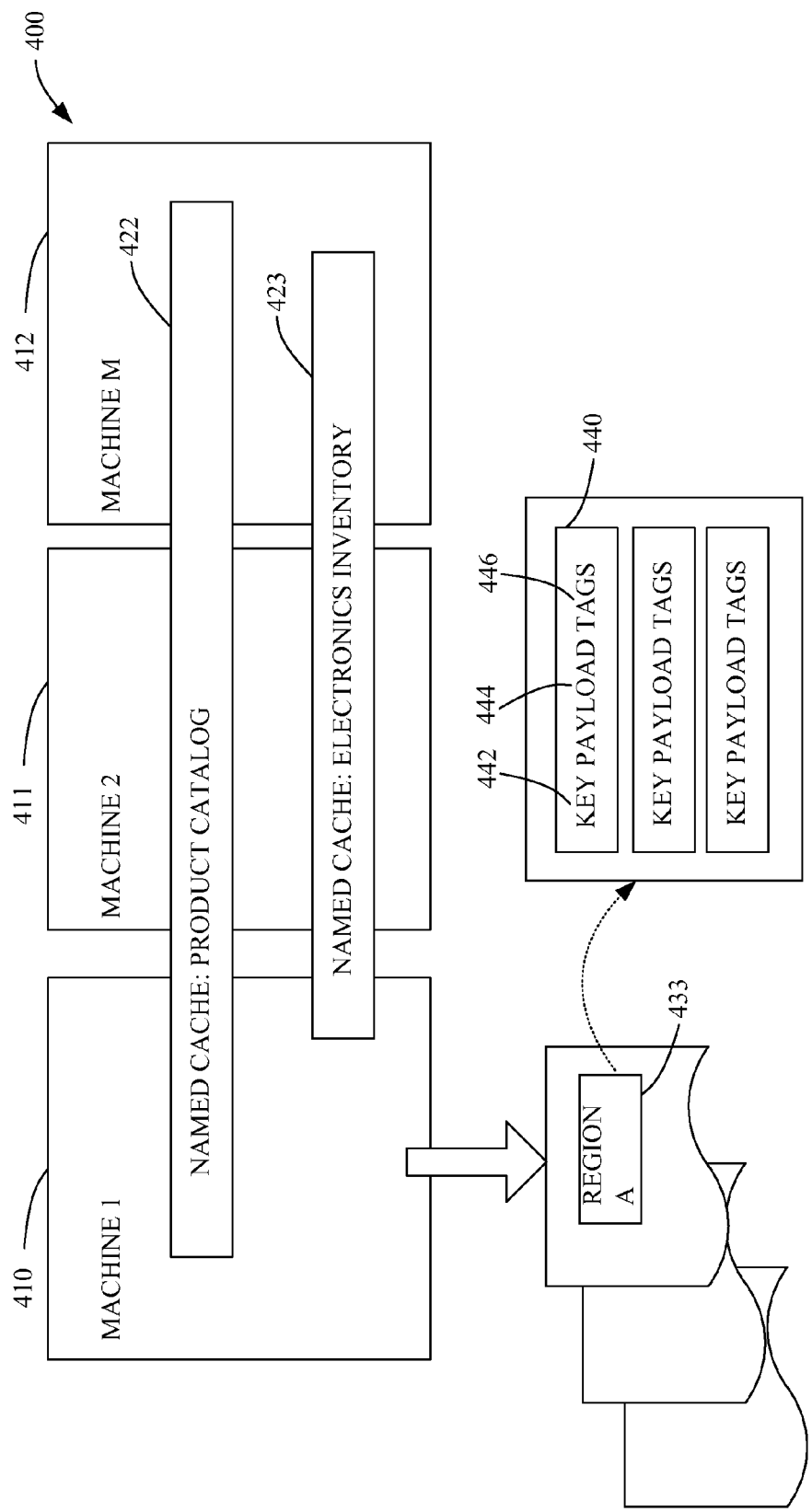
FIG. 4 illustrates a distributed cache that includes a runtime deployed on multiple machines.

FIG. 4 illustrates a distributed cache system (400) that includes the runtime deployed on multiple machines (410, 411, 412) (1 to m, m being an integer) that form a cluster. On each machine (410, 411, 412) there can exist one or more runtimes also referred to as cache hosts. Each cache host (422, 423) can host one or more named caches. The named caches can be configured in the distributed cache configuration file. Moreover, the named caches can be spread around all or a subset of the machines (410, 411, 412) in the cluster. In addition, within each named cache there can exist one or more regions (433). Such regions can be implicitly created by the distributed cache or can be explicitly defined by the application. In general, all items in a region (433) can be guaranteed to be co-located on a cache host. Such can improve performance for operations that operate on multiple items in the region, such as query and other set operations. Moreover, the node where a region is located can be deemed as the primary node of that region, wherein typically access to this region will be routed to the primary node for that region. If the named cache is configured to have "backups" for high availability, then one or more other nodes can be chosen to contain a copy of this data. Such nodes are called secondary nodes for that region. All changes made to the primary node can also be reflected on these secondary nodes. Thus if the primary node for a region fails, the secondary node can be used to retrieve the data without having to have logs written to disk.

The following is a code example that shows the creation of a named cache and region.

```
// CacheFactory class provides methods to return cache objects
// Create instance of cachefactory (reads appconfig)
DataCacheFactory fac = new DataCacheFactory( );
// Get a named cache from the factory
DataCache catalog = fac.GetCache("catalogcache");
//--------------------------------------------------------
// Simple Get/Put
catalog.Put("toy-101", new Toy("thomas", ...));
// From the same or a different client
Toy toyObj = (Toy)catalog.Get("toy-101");
// --------------------------------------------------------
// Region based Get/Put
catalog.CreateRegion("toyRegion");
// Both toy and toyparts are put in the same region
catalog.Put("toy-101", new Toy( ...), "toyRegion");
catalog.Put("toypart-100", new ToyParts(...), "toyRegion");
Toy toyObj = (Toy)catalog.Get("toy-101", "toyRegion");
```

Each cache region (433) can include one or more cache items (440). Each cache item can include an identifier such as a key (442), a value or payload (444), and one or more tags (446). Cache regions may also be nested so that a cache region may include one or more other cache regions (433) and/or one or more cache items (440).

IV. Cache Layering Techniques

Figure 5:
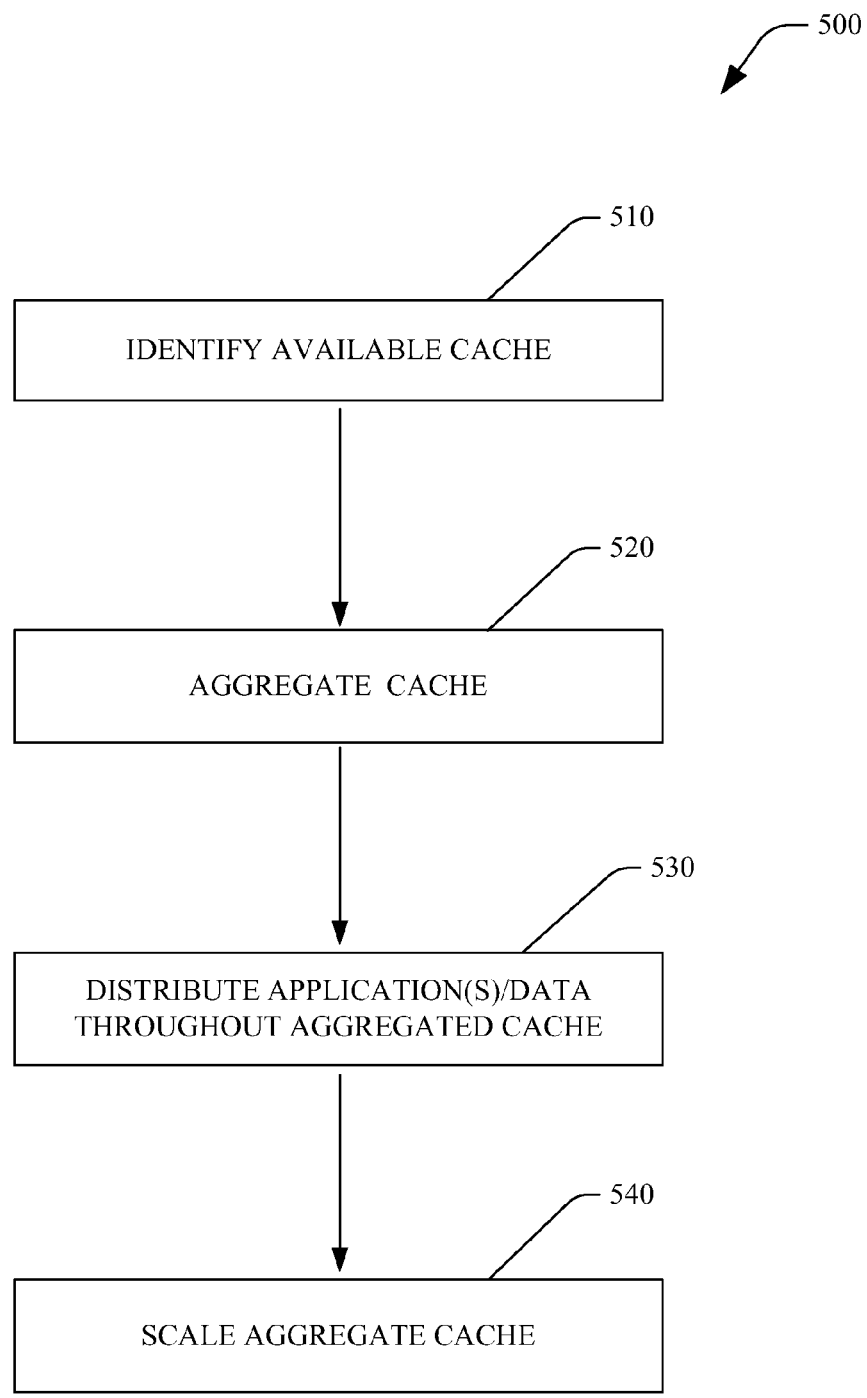
FIG. 5 illustrates a particular methodology of distributing cache.

FIG. 5 illustrates a related methodology (500) of distributing a cache. While the exemplary methods of FIG. 5 and other figures herein are illustrated and described herein as a series of blocks representative of various events and/or acts, the described tools and techniques are not limited by the illustrated ordering of such blocks. For instance, some acts or events may occur in different orders and/or concurrently with other acts or events, apart from the ordering illustrated herein, in accordance with the described tools and techniques. In addition, not all illustrated blocks, events or acts, may implement a methodology in accordance with the described tools and techniques. Moreover, the exemplary method and other methods according to the tools and techniques may be implemented in association with one or more of the methods illustrated and described herein, as well as in association with other systems and apparatus not illustrated or described.

In the methodology (500), cache available to the system can be identified (510), wherein the cache can be scalable to a plurality of machines via a layering arrangement (e.g., dynamic scaling by adding new nodes). The cache can be aggregated (520) into a single unified cache, as presented to a user thereof. Applications/data can be distributed (530) throughout the aggregated cache. In addition, the aggregated cache can be scaled (540) depending on the changing characteristics of the applications and/or data.

Figure 6:
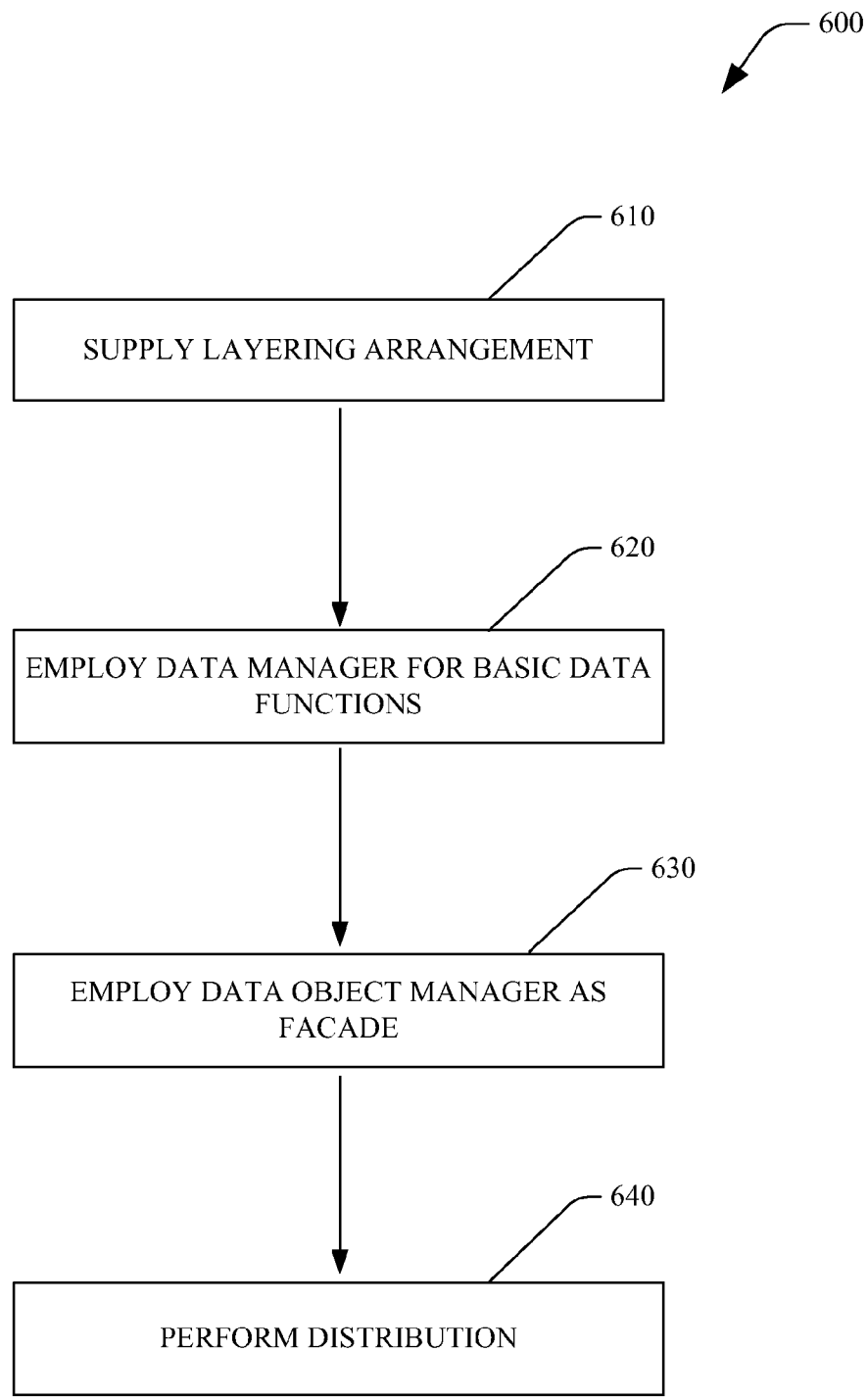
FIG. 6 illustrates a further methodology of implementing a layering arrangement for a distributed cache.

FIG. 6 illustrates a related methodology (600) of implementing a distributed cache via a layering arrangement. Initially a layering arrangement can be supplied (610). The layering arrangement can include a data manager component, an object manager component and a distributed object manager component—the set up of which can be implemented in a modular fashion; wherein, the distributed object manager component can be positioned on top of the object manager component, which can be placed on top of the data manager component.

The data manager component can be employed (620) to supply basic data functions (e.g., hash functions). Likewise, the object manager component can be employed (630) as an object facade thereon including cache objects, with the distributed object manager component providing the distribution. As such, the object manager component and data manager component can act as local entities, wherein the distribution manager can perform (640) the distributions.

V. Unified Cache System & Data Types

Figure 7:
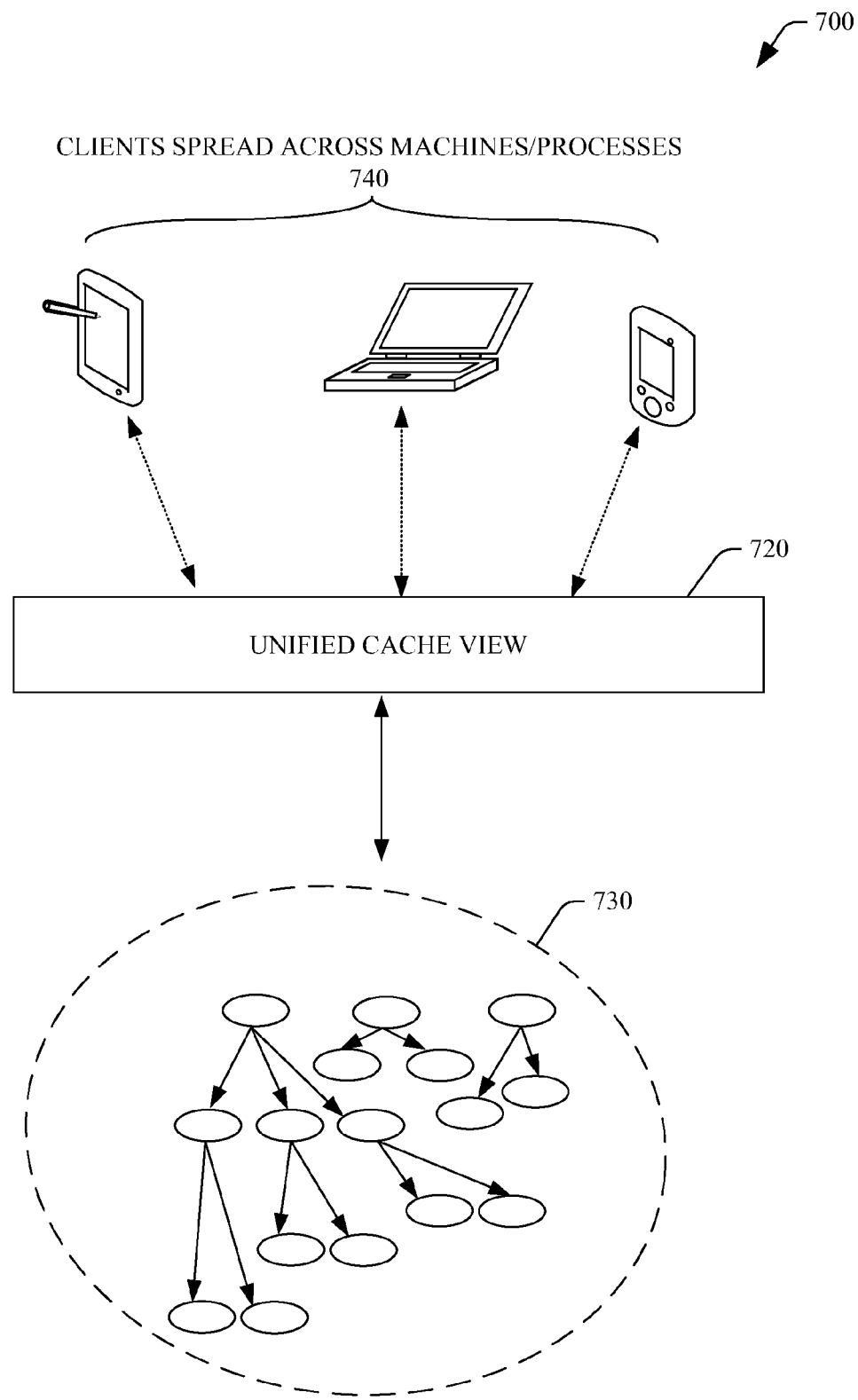
FIG. 7 illustrates an exemplary illustration of a unified cache view.

FIG. 7 illustrates a cache system (700) that can provide a unified cache view (720) of one or more caches (730) for clients (740) spread across machines and/or processes. A cache system (700) including this unified cache view (720) can provide an explicit, distributed, in-memory application cache for all kinds of data with consistency and query. Such data can reside in different tiers (in different service boundaries) with different semantics. For example, data stored in the backend database can be authoritative and can make it desirable to have a high degree of data consistency and integrity. Typically, there tends to be a single authoritative source for any data instance. Most data in the mid-tier, being operated by the business logic tends to be a copy of the authoritative data. Such copies are typically suitable for caching. As such, understanding the different types of data and their semantics in different tiers can help define desired degrees of caching.

A. Reference Data

Reference data is a version of the authoritative data. It is either a direct copy (version) of the original data or aggregated and transformed from multiple data sources. Reference data is practically immutable—changing the reference data (or the corresponding authoritative data) creates a new version of the reference data. That is, every reference data version can be different from other reference data versions. Reference data is a candidate for caching; as the reference data typically does not change, it can be shared across multiple applications (users), thereby increasing the scale and performance.

For example, a product catalog application aggregating product information across multiple backend application and data sources can be considered. Most common operation on the catalog data is the read operation (or browse); a typical catalog browse operation iterates over a large amount of product data, filters it, personalizes it, and then presents the selected data to the users. Key based and query based access is a common form of operation. Caching can be beneficial for catalog access. If not cached, operations against such an aggregate catalog may include the operations to be decomposed into operations on the underlying sources, to invoke the underlying operations, to collect responses, and to aggregate the results into cohesive responses. Accessing the large sets of backend data for every catalog operation can be expensive, and can significantly impact the response time and throughput of the application. Caching the backend product data closer to the catalog application can significantly improve the performance and the scalability of the application. Similarly, aggregated flight schedules are another example of reference data.

Referenced data can be refreshed periodically, usually at configured intervals, from its sources, or refreshed when the authoritative data sources change. Access to reference data, though shared, is mostly read. Local updates are often performed for tagging (to help organize the data). To support large scale, reference data can be replicated in multiple caches on different machines in a cluster. As mentioned above, reference data can be readily cached, and can provide high scalability.

B. Activity Data

Activity data is generated by the currently executing activity. For example, the activity may be a business transaction. The activity data can originate as part of the business transaction, and at the close of the business transaction, the activity data can be retired to the backend data source as historical (or log) information. For example, the shopping cart data in an online buying application can be considered. There is one shopping cart, which is exclusive, for each online buying session. During the buying session, the shopping cart is cached and updated with products purchased, wherein the shopping cart is visible and accessible only to the buying transaction. Upon checkout, once the payment is applied, the shopping cart is retired (from the cache) to a backend application for further processing. Once the business transaction is processed by the backend application, the shopping cart information is logged for auditing (and historical) purposes.

While the buying session is active, the shopping cart is accessed both for read and write; however, it is not shared. This exclusive access nature of the activity data makes it suitable for distributed caching. To support large scalability of the buying application, the shipping carts can be distributed across the cluster of caches. Since the shopping carts are not shared, the set of shopping carts can be partitioned across the distributed cache. By dynamically configuring the distributed cache, the degree of scale can be controlled.

C. Resource Data

Both reference (shared read) and activity (exclusive write) data can be cached. It is to be appreciated that not all application data falls into these two categories. There is data that is shared, concurrently read and written into, and accessed by large number of transactions. For example, considering inventory management application, the inventory of an item has the description of the item and the current quantity. The quantity information is authoritative, volatile, and concurrently accessed by large number of users for read/write. Such data is known as the resource data; the business logic (e.g. the order application logic) runs close to the resource data (e.g. quantity data). The resource data is typically stored in the backend data stores. However, for performance reasons it can be cached in the application tier. While caching the quantity data in memory on a single machine can provide performance improvements, a single cache typically cannot provide availability or scale when the order volume is high. Accordingly, the quantity data can be replicated in multiple caches across the distributed cache system.

VI. Distributed Cache with Artificial Intelligence Component

Figure 8:
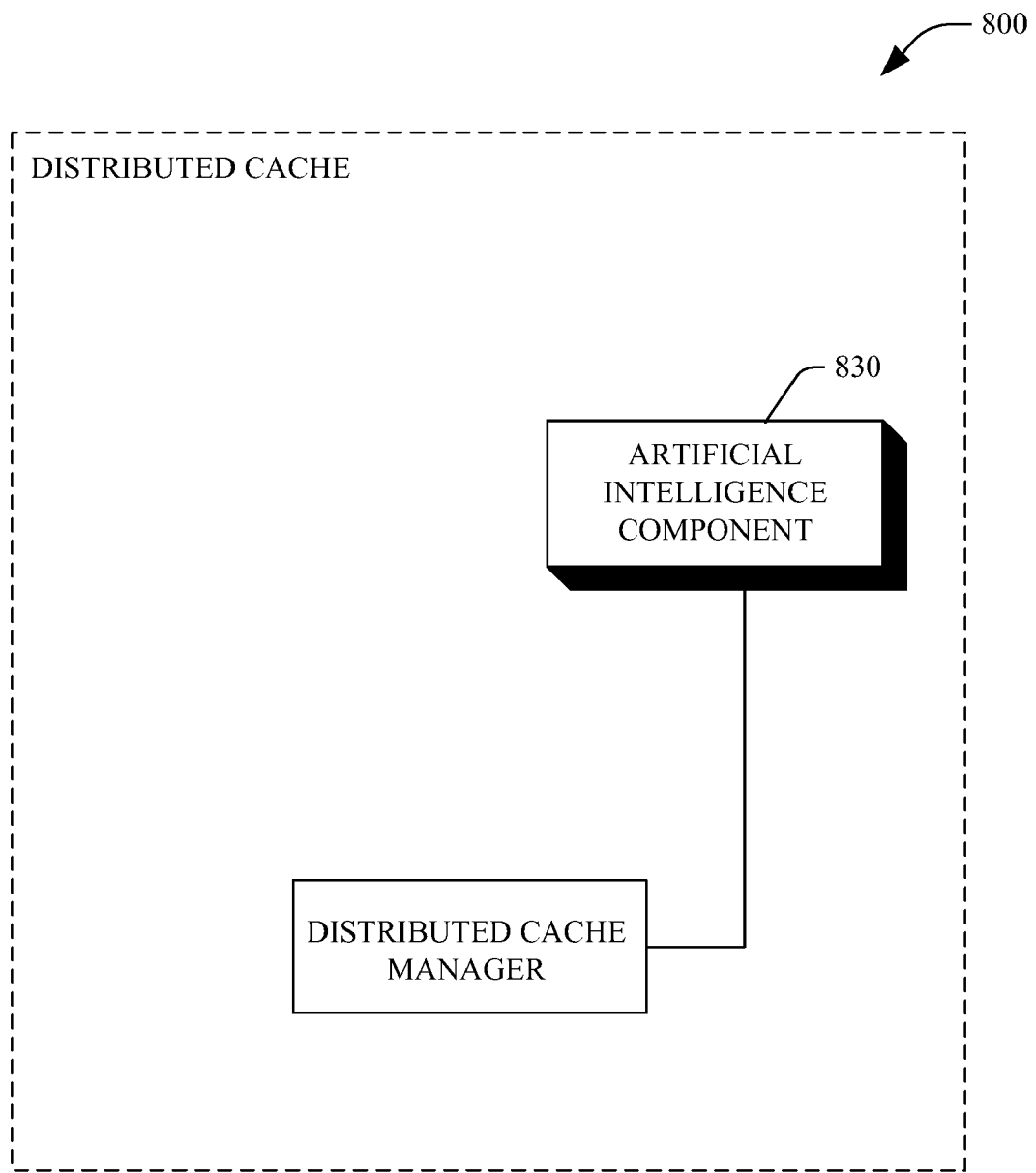
FIG. 8 illustrates an artificial intelligence (AI) component that can be employed to facilitate inferring and/or determining when, where, and/or how to cache data in a distributed environment.

FIG. 8 illustrates an artificial intelligence (AI) component (830) that can be employed in a distributed cache (800) to facilitate inferring and/or determining when, where, and/or how to scale the distributed cache and/or distribute application data therebetween. For example, such artificial intelligence component (830) can supply additional analysis with the distributed cache manager to improve distribution and/or scaling of the system. As used herein, the term "inference" refers generally to the process of reasoning about or inferring states of the system, environment, and/or user from a set of observations, as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component (830) can employ any of a variety of suitable AI-based schemes as described supra in connection with facilitating various aspects of the herein described tools and techniques. For example, a process for learning explicitly or implicitly how or what candidates are of interest, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, classifiers can be explicitly trained (e.g., via a generic training data) as well as implicitly trained (e.g., via observing user behavior, receiving extrinsic information) so that the classifier can be used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$. Moreover, a rule based mechanism can further be employed for interaction of a routing manager and a routing layer associated therewith (e.g., load balancing, memory allocation and the like).

VII. Suitable Computing Environment

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or a portion thereof in any manner. It is to be appreciated that a myriad of additional or alternate examples could have been presented, but have been omitted for purposes of brevity.

Furthermore, all or portions of the described tools and techniques can be implemented as a system, method, apparatus, or article of manufacture using standard programming and/or engineering techniques to produce software, firmware, hardware or any combination thereof to control a computer to implement the disclosed tools and techniques. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
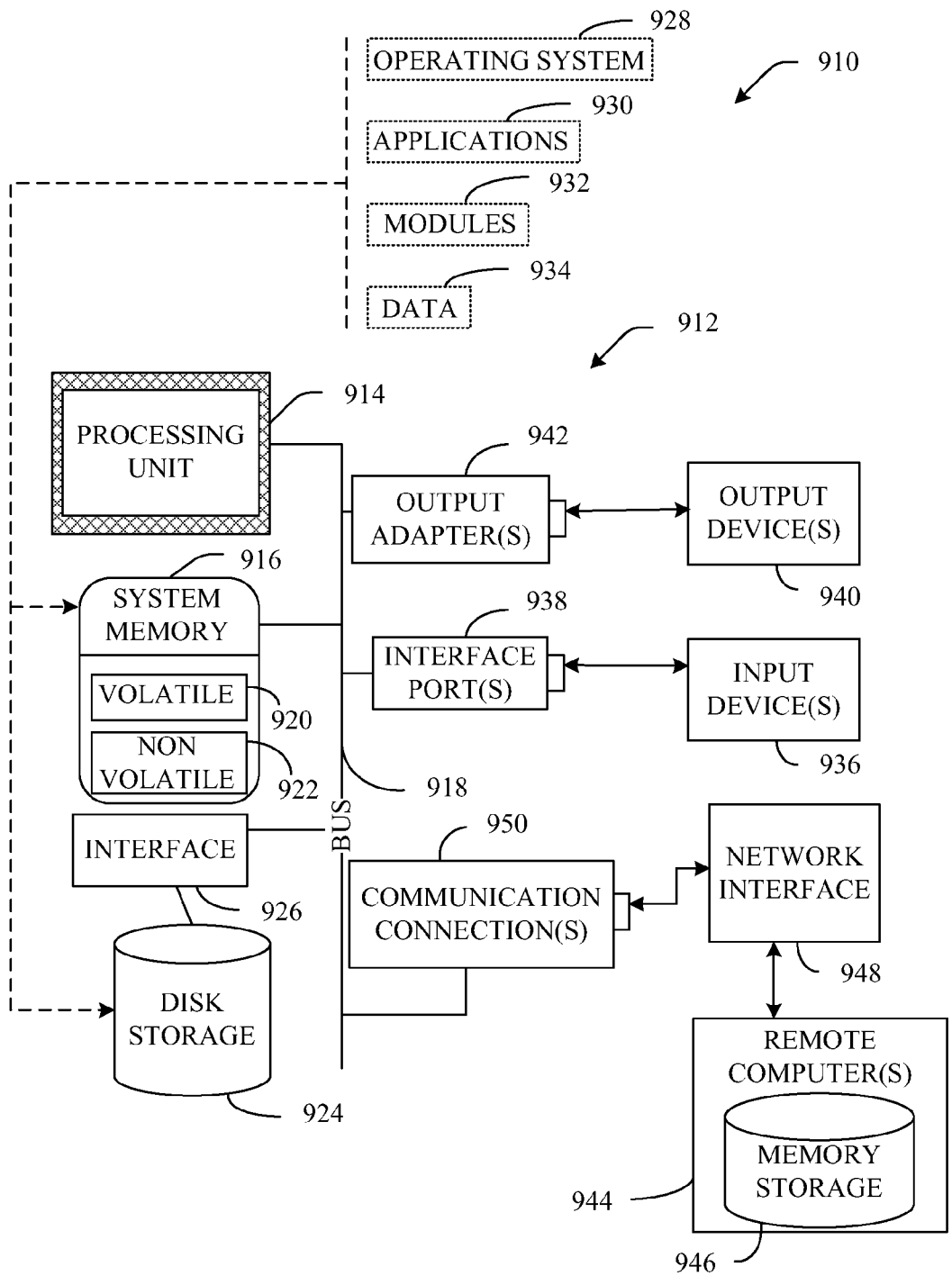
FIG. 9 illustrates an exemplary environment for implementing various aspects of the described caching tools and techniques.
Figure 10:
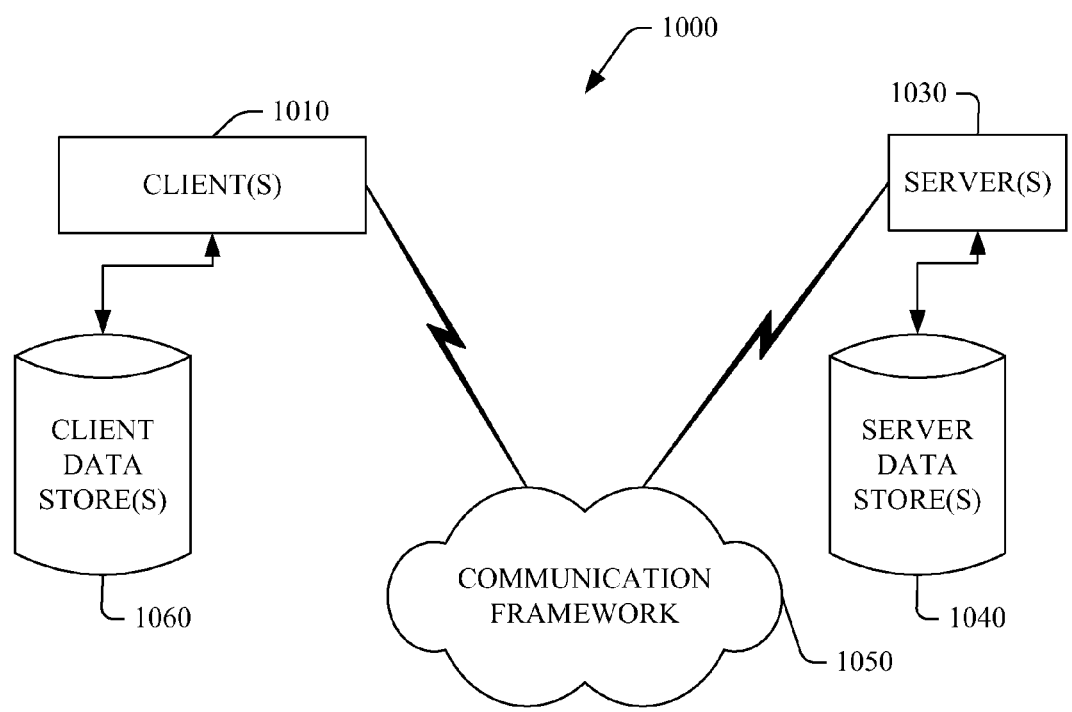
FIG. 10 is a schematic block diagram of a sample-computing environment that can be employed for caching configurations such as distributing cache.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the tools and techniques also may be implemented in combination with other program modules.

As used in this application, the terms "component", "system", and "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the tools and techniques can be practiced on stand-alone computers. In a distributed computing environment, program modules may be located in both local and remote memory storage devices.

With reference to FIG. 9, an exemplary environment (910) for implementing various aspects of the described tools and techniques is described that includes a computer (912). The computer (912) can include a processing unit (914), a system memory (916), and a system bus (918). The system bus (918) can couple system components including, but not limited to, the system memory (916) to the processing unit (914). The processing unit (914) can be any of various available processors. Dual microprocessors and other multiprocessor architectures also can be employed as the processing unit (914).

The system bus (918) can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory (916) can include volatile memory (920) and/or nonvolatile memory (922). The basic input/output system (BIOS), containing the basic routines to transfer information between elements within the computer (912), such as during startup, can be stored in nonvolatile memory (922). By way of illustration, and not limitation, the nonvolatile memory (922) can include read only memory (ROM), programmable ROM (PROM), electrically programmable ROM (EPROM), electrically erasable ROM (EEPROM), or flash memory. The volatile memory (920) can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer (912) can also includes removable/non-removable, volatile/nonvolatile computer storage media. FIG. 9 illustrates a disk storage (924), wherein such disk storage (924) can include, but is not limited to, devices like a magnetic disk drive, floppy disk drive, tape drive, Jaz drive, Zip drive, LS-60 drive, flash memory card, or memory stick. In addition, disk storage (924) can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage (924) to the system bus (918), a removable or non-removable interface is typically used, such as interface (926).

It is to be appreciated that FIG. 9 describes software that acts as an intermediary between users and the basic computer resources described in suitable operating environment (910). Such software can include an operating system (928). The operating system (928), which can be stored on disk storage (924), can act to control and allocate resources of the computer (912). System applications (930) can take advantage of the management of resources by operating system (928) through program modules (932) and program data (934) stored either in system memory (916) or on disk storage (924). It is to be appreciated that various components described herein can be implemented with various operating systems or combinations of operating systems.

A user can enter commands or information into the computer (912) through input device(s) (936). Input devices (936) include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit (914) through the system bus (918) via interface port(s) (938). Interface port(s) (938) include, for example, a serial port, a parallel port, a game port, and a universal serial bus (USB). Output device(s) (940) use some of the same type of ports as input device(s) (936). Thus, for example, a USB port may be used to provide input to computer (912), and to output information from computer (912) to an output device (940). Output adapter (942) is provided to illustrate that there are some output devices (940) like monitors, speakers, and printers, among other output devices (940) that utilize such adapters. The output adapters (942) include, by way of illustration and not limitation, video and sound cards that provide a means of connection between the output device (940) and the system bus (918). Other devices and/or systems of devices provide both input and output capabilities such as remote computer(s) (944).

Computer (912) can operate in a networked environment using logical connections to one or more remote computers, such as remote computer(s) (944). The remote computer(s) (944) can be a personal computer, a server, a router, a network PC, a workstation, a microprocessor based appliance, a peer device or other common network node and the like, and typically includes many or all of the elements described relative to the computer (912). For purposes of brevity, only a memory storage device (946) is illustrated with remote computer(s) (944). Remote computer(s) (944) is logically connected to the computer (912) through a network interface (948) and then physically connected via a communication connection (950). The network interface (948) encompasses communication networks such as local-area networks (LAN) and widearea networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

A communication connection(s) (950) refers to the hardware/software employed to connect the network interface (948) to the bus (918). While the communication connection (950) is shown for illustrative clarity inside computer (912), it can also be external to the computer (912). The hardware/software for connection to the network interface (948) includes, for exemplary purposes only, internal and external technologies such as, modems including regular telephone grade modems, cable modems and DSL modems, ISDN adapters, and Ethernet cards.

FIG. 10 is a schematic block diagram of a sample computing environment (1000) that can be employed for distributing cache. The environment (1000) can include one or more client(s) (1010). The client(s) (1010) can be hardware and/or software (e.g., threads, processes, computing devices). The environment (1000) can also include one or more server(s) (1030). The server(s) (1030) can also be hardware and/or software (e.g., threads, processes, computing devices). The servers (1030) can house threads to perform transformations by employing the components described herein, for example. One possible communication between a client (1010) and a server (1030) may be in the form of a data packet adapted to be transmitted between two or more computer processes. The environment (1000) can include a communication framework (1050) that can be employed to facilitate communications between the client(s) (1010) and the server(s) (1030). The client(s) (1010) can be operatively connected to one or more client data store(s) (1060) that can be employed to store information local to the client(s) (1010). Similarly, the server(s) (1030) can be operatively connected to one or more server data store(s) (1040) that can be employed to store information local to the servers (1030).

VIII. Cache Regions

Cache regions and various uses for cache regions in a cache system will now be discussed in more detail.

A. Cache Region Mapping

Figure 11:
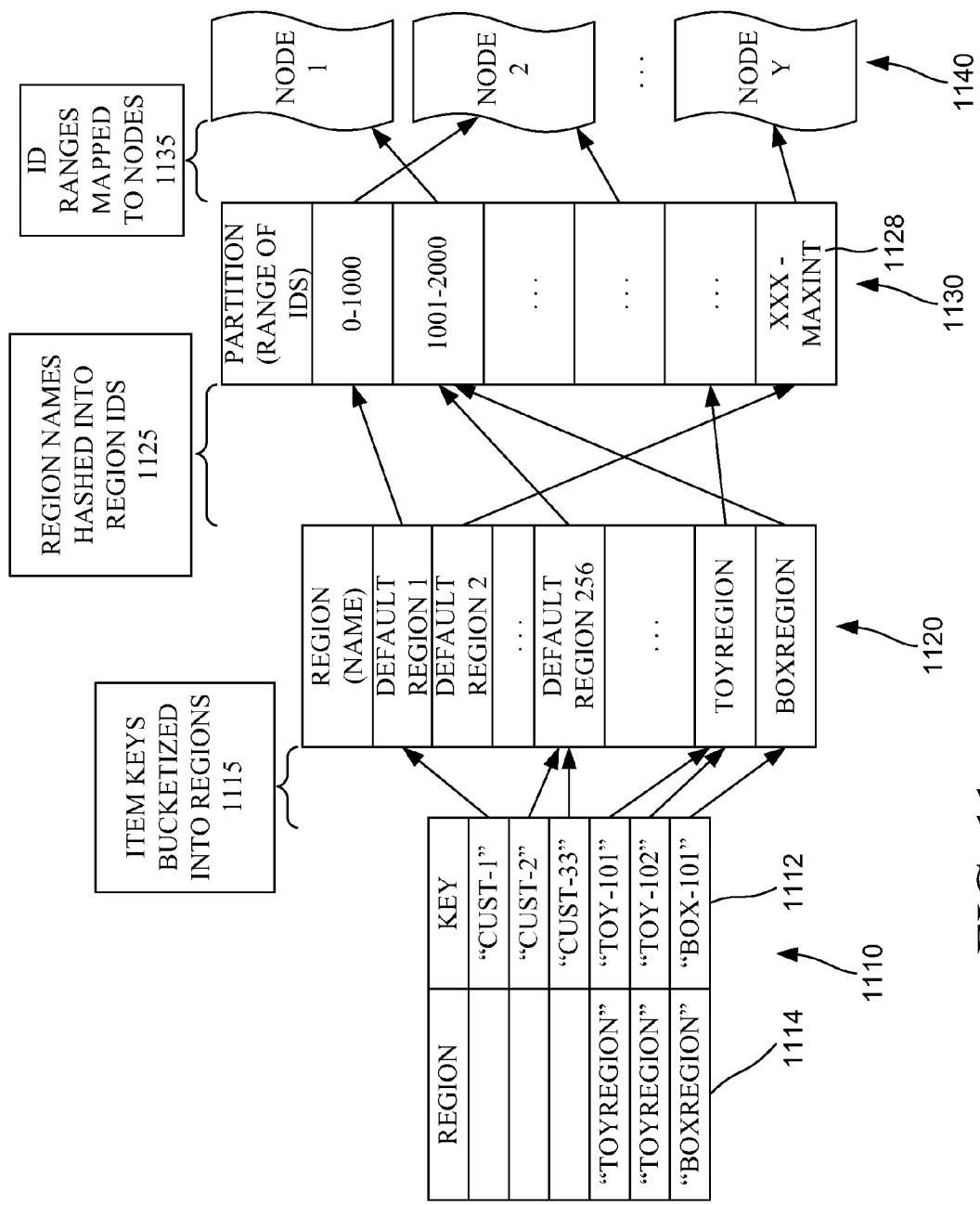
FIG. 11 is a schematic illustration of a cache region mapping technique.

Referring now to FIG. 11, a cache region mapping technique will be discussed. In the technique, cache item metadata (1110) can include an item key (1112) for each item. The item key (1112) can be an item name, a numerical key, or some other type of identifier corresponding to the item. Additionally, the item metadata (1110) for each item can include a region key (1114), which can be a name of the corresponding region. The item metadata can be provided by an application that is outside the cache system, such as one of the applications (201, 203, 205, 310, 312, or 314) discussed above. For example, the application can make a put API call to a cache manager in the cache system, such as one of the examples discussed above: catalog.Put("toyRegion", "toy-101", new Toy(.,.)). This API call requests that the cache system put, or store, the cache item sent with the call in the cache region having a region key "toyRegion" in the cache named "catalog". The API call also specifies the item key "toy-101" corresponding to the cache item to be stored.

The region may have been created previously in an express region creation request, such as the one discussed above: catalog.CreateRegion("toyRegion"). Alternatively, a region can be created in response to an implicit region creation request. For example, if a region having a region key "toyRegion" had not yet been created in the "catalog" cache, then the API call "catalog.Put("toyRegion", "toy-101", new Toy(.,.))" could be interpreted by the cache system as a request to create a new region with the region key "toyRegion" in the "catalog" cache, and to put the item corresponding to the key "toy-101" in the new region.

As discussed above, in some instances an application may not specify a region for an item to be stored in a cache, even if the cache system is capable of utilizing regions. For example, an application may make an API call as follows: catalog.Put("cust-1", new Toy(.,.)), requesting the cache system to put the "cust-1" cache item in the "catalog" cache, but not specifying a region. Even if a region is not specified by an application, the cache system may still store an item specified by the application in a region, such as a default region. Alternatively, the cache system may only place items in regions if the regions are specified in a put request.

Referring still to FIG. 11, for items that are to be stored in regions, the cache system can bucketize (1115) the corresponding item keys (1112) into the corresponding cache regions specified by cache region keys (1120), such as cache region names. In other words, the cache system can assign the item keys (1112) to corresponding region keys (1120), such as in a table. In some situations, regions may be empty, having been created but not yet having items assigned to them. In other situations, regions may include one or more cache items. In addition, regions may be nested, so that a region can include one or more cache items and/or one or more cache regions.

In the example illustrated in FIG. 11, the item keys "CUST-1" "CUST-2" and "CUST-3" have no specified region, but are bucketized (1115) into a region having a region key "DEFAULT REGION 1", and the keys "CUST-2" and "CUST-33" are bucketized (1115) into a region having a region key "DEFAULT REGION 256." The item keys "TOY-101" and "TOY-102" correspond to region key (1114) "TOYREGION" and they are bucketized (1115) into the "TOYREGION" region. Likewise, the item key "BOX-101" has a corresponding region key (1114) "BOXREGION" and it is bucketized (1115) into the "BOXREGION" region.

The region names or keys can be hashed (1125) into region identifiers or hash keys (1128), and partitions of the partitioned distributed cache can be specified as ranges (1130) of those hash keys (1128). Hashing (1125) can be done with a standard hashing function that will produce hash keys suitable for arranging in ranges. The partition region hash key ranges (1130) can each be mapped to a corresponding primary node (1140) in the cache cluster, and the items in those regions will be stored in the corresponding assigned nodes. A hash table or some other data structure can indicate the correspondence between item keys, region keys, region hash keys, partitions, and nodes. Thus, each region can be assigned to a single partition and the entire region can be co-located or stored on a single cache node.

Bucketizing (1115) item keys (1112) into regions, hashing (1125) region keys (1120) into hash keys (1128), and mapping (1135) partition ranges (1130) of hash keys to nodes (1140) can be done by the data manager component (110) discussed above with reference to FIG. 1 or by some other component. The cache items can then be stored and maintained in the assigned nodes (1140) of the distributed partitioned cache.

Alternatively, some other technique could be utilized for assigning cache item keys to region keys, and then assigning or mapping those region keys to cache nodes. For example, a function other than a hash function could be used to produce the partition ranges of region identifiers. Indeed, the regions corresponding to particular nodes could be specified in some way other than by specifying ranges, such as by mapping cache region names to particular cache nodes.

B. Cache Region Techniques

Figure 12:
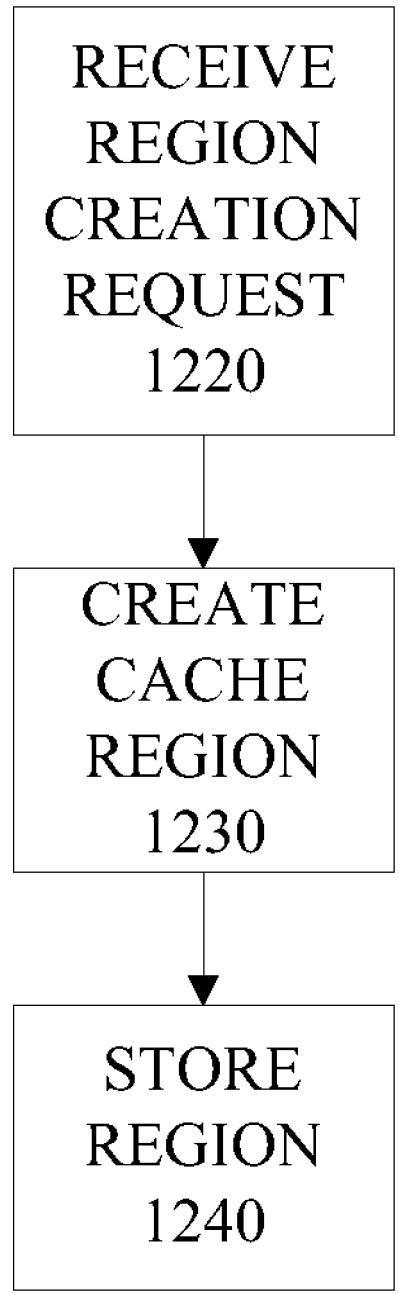
FIG. 12 is a flowchart of a cache region technique.

The following techniques can be implemented in cache systems and computing environments such as those discussed above or in some other cache systems and/or computing environments. Referring now to FIG. 12, a cache region storage technique will be described. In the technique, a cache region creation request can be received (1220). For example, the cache region creation request can be received (1220) at a cache system, and it can be received from an application outside the cache system. An application can still be considered to be outside the cache system if components of the cache system are embedded in applications in the cluster. The cache region creation request may be an explicit creation request that explicitly requests the cache system to create the region. Alternatively, the cache region creation request may be an implicit creation request from which a cache system can infer that the creation of a cache region is being requested.

In response to receiving (1220) the cache region creation request, the cache region can be created (1230). For example, the cache system can associate the region with an identifier, and assign the region to a particular cache node, such as by including the cache region in a particular cache partition that is in turn assigned to a particular cache node. The cache node may correspond to a particular physical or virtual computer machine so that the entire region is prevented from being spread across multiple computer machines. The cache region can be stored (1240) in the assigned cache node. Of course, the cache region may later be assigned to a different cache node. Also, the region is still considered to be stored on a single primary cache node if the region is also replicated on a secondary cache node that is different from the primary cache node.

Figure 13:
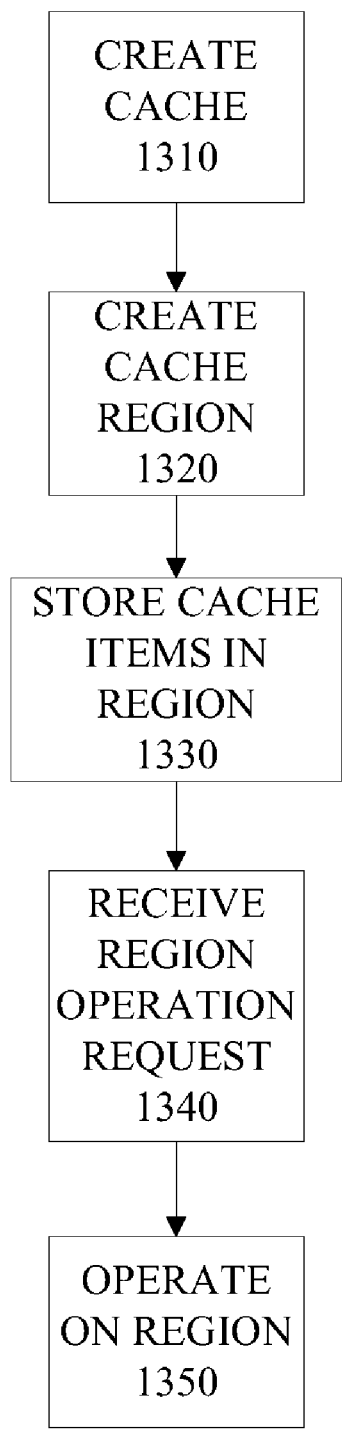
FIG. 13 is a flowchart of another cache region technique.

Referring to FIG. 13, a cache region operation technique will be described. A cache can be created (1310), such as by defining a named distributed partitioned cache in a cache system. The cache system can be part of a computer system that also hosts a running application. A cache region can be created (1320) in the cache, and cache items can be stored (1330) in the cache region.

In addition, a region operation request can be received (1340), and the region can be operated (1350) on in response to the region operation request. A region operation request is a request for one or more operations to be performed on a specified region, but it can be any of a wide variety of requests.

For example, the region operation request can be a bulk write request that includes a plurality of identified cache items to be stored in the region, and the operation (1350) on the cache region can include storing the plurality of identified cache items in the region. Cache insertion APIs can take a list of items to be inserted into the region and all items in the region can be co-located in one storage process, so the entire list of items can be sent in bulk (or in chunks as needed) to the cache machine. This can save network overhead, as compared to doing individual inserts for each cache item. In addition, the entire insertion can be completed before the region is made accessible for read (get) operations. For example, the region may be made accessible by attaching the region hash table to the internal cache metadata structures. Doing this for the entire region at one time can guarantee atomicity of the insert, which can be useful when it is desirable for the entire contents of a region to be present for consistency reasons.

As another example, the request can be a request to delete the region (e.g., "Cache.DeleteRegion(String regionName)"), and the operation (1350) can include deleting the region in a single operation, rather than sending delete requests and performing delete operations for each item in the region. In an implementation where the cache includes a replica of the cache region (such as in a high availability scenario), the cache region operation request can be a request to delete the cache region, and the operation (1350) on the cache region can include deleting the cache region and the replica of the cache region (such as by distributing the logical region delete operation to the secondary nodes, as opposed to sending every individual item deletion).

As another example, the cache region operation request can include a get request, and the operation (1350) on the cache region can include sending all the cache items in the cache region to the application that sent the request. In yet another example, the cache region operation request can include a request to store metadata corresponding to the region in a persistent state, and the operation (1350) on the cache region can include storing the metadata in a persistent state.

In yet another example, the cache region operation request can be a request to replace one or more items in the region, and the operation (1350) on the cache region can include locking the entire region and replacing the one or more items. This can help to provide atomicity of read operations, so that a read will fail or succeed for the entire region. As noted above, this can be useful when the entire contents of the region must be present for consistency reasons.

Optimistic concurrency at the region level can be achieved by attaching a version number to the primary region in the cache. This version number can be updated atomically when create, update, or delete operations are performed on the primary region. This version number can be supplied to requesting applications in response to GetCacheItem requests as a RegionVersion property. When an application sends a PutCacheItem request along with an updated cache item, this RegionVersion property may be supplied along with the request. If the RegionVersion sent with the PutCacheItem request is the same as the current RegionVersion for the primary region, then this indicates that the region has not been modified since the application received the item from the cache, and the update can be performed. If the RegionVersion sent with the PutCacheItem request does not match the current RegionVersion for the primary cache region, then this indicates that the region was modified after the item was sent to the application, and the PutCacheItem request can result in a failure. The cache version can be checked before performing a variety of different types of operations, such as bulk write operations, delete operations, get or read operations, operations that store cache metadata in a persistent state, and replacement operations. This can help to provide region level consistency of operations. Accordingly, in yet another example of a cache region operation request, the request can include a request version identifier. In this example, the operation (1350) on the cache region can include comparing the request version identifier with a region version identifier associated with the primary region in the cache, and operating on the region if the request version identifier matches the region version identifier. If the request version identifier does not match the region version identifier, then the requested operation may not be performed, and a failure notification may be sent in response to the request.

Figure 14:
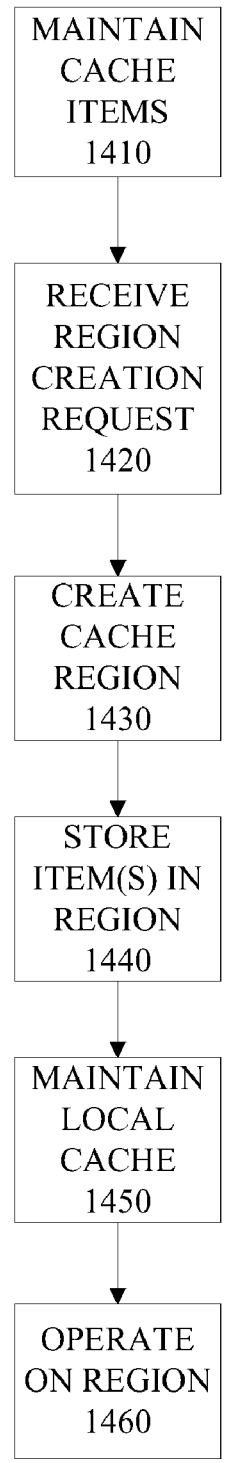
FIG. 14 is a flowchart of yet another cache region technique.

Referring to FIG. 14, yet another cache region technique will be described. In this technique, a plurality of cache items can be maintained (1410) in a cache, such as a distributed partitioned cache in a cache system. The cache system can be part of a computer system that also includes a running application. A region creation request can be received (1420), such as being received from the running application. A cache region in the cache can be created (1430) in response to receiving (1420) the region creation request.

One or more cache items can be stored (1440) in the region, such as in response to receiving a storage request from the application. For example, the storage request can identify the cache item(s) to be stored and the region where the cache item(s) are to be stored. Identifying the region(s) or item(s) can include identifying them explicitly by name or by some alternative. Alternatively, identifying could be done implicitly. For example, a storage request could identify a number of cache items to be stored, and could specify, either implicitly or explicitly, that those cache items be stored in a single region.

The technique of FIG. 14 may also include maintaining (1450) a local cache, such as maintaining the local cache on a machine running the application. The local cache can store a replica of the region, and maintaining the local cache can include invalidating the entire region in the local cache in a single operation. For example, this could be done in response to changes being made to one or more items in the primary region in the main cache (i.e., in the primary storage location of the region in the cache) or in some other storage location, such as a permanent storage location that stores information corresponding to information in the region.

The technique of FIG. 14 can also include operating (1460) on the region. For example, operating (1460) on the region can include expiring the region in a single region expiration operation, evicting the region in a single region eviction operation, or automatically deleting the cache region when all cache items in the cache region have been deleted. For example, when a cache region is created a call can be made with the following syntax: "Cache.CreateRegion(String RegionName, Timespan DefaultRegionExpiration, Boolean AllowExpirationOfItems, Boolean AllowEvictionOfItems)". If the Boolean expressions for expiration of items ("Boolean AllowExpirationOfItems") and eviction of items ("Boolean AllowEvictionOfItems") within a region is set to false, then the entire region can be considered for eviction from the cache, such as based on least recently used (LRU) policies. A component of the cache system, such as a data manager component, can record one last accessed time on the region container for the last time that any item in the region was accessed, instead of tracking the last accessed times for each cache item in the region. This allows the eviction algorithm to include the region container in the eviction chain, as opposed to including each cache item in the eviction chain. In addition, if the expiration of items is allowed for the region, then a default time ("Timespan DefaultRegionExpiration") for expiration of cache items in the region can be specified by an application that requests creation of the region.

Also in the technique of FIG. 14, the cache can be spread across a plurality of computer machines or nodes, and the technique can include co-locating the entire cache region in one of the plurality of machines or nodes.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

We claim:

1. A computer-implemented method, comprising:
receiving a cache region creation request at a distributed partitioned cache system;
in response to receiving the creation request, creating a cache region of a distributed partitioned cache in the cache system, the cache being spread over a plurality of cache nodes; and
storing the entire cache region in one of the plurality of nodes, and limiting the storage of the cache region in the cache to be stored entirely in the one of the plurality of nodes.

2. The method of claim 1, wherein the creation request is an implicit cache region creation request from an application.

3. The method of claim 1, wherein the creation request is an explicit cache region creation request from an application.

4. The method of claim 1, wherein:
the cache region comprises a plurality of cache items;
receiving the creation request comprises receiving the creation request from an application that is outside the cache system;
the cache comprises a plurality of partitions, wherein each partition of the plurality of partitions is stored in one of the plurality of nodes and each partition includes one or more regions;
the plurality of nodes are on a plurality of physical computer machines; and
storing the entire cache region in one of the plurality of nodes comprises storing the entire cache region in one of the plurality of machines.

5. A computer system comprising:
an application running on the computer system; and
a cache system running on the computer system, the cache system comprising instructions that when executed by one or more processors perform the following acts:
creating a cache region in a cache in the cache system in response to receiving a cache region creation request from the application;
receiving a storage request from the application, the storage request identifying the cache region and one or more cache items to be stored in the cache region;
storing the one or more cache items in the cache region in response to receiving the storage request; and
deleting the entire cache region in a single operation.

6. The computer system of claim 5, wherein the cache is a distributed cache and the region is a primary region, and wherein the acts further comprise maintaining a local cache on a machine running the application, the local cache storing a replica of the primary region, and maintaining the local cache comprising invalidating the entire replica in the local cache in a single operation.

7. The computer system of claim 5, wherein deleting the cache region comprises expiring the region in a single operation.

8. The computer system of claim 5, wherein deleting the cache region comprises evicting the region in a single operation.

9. The computer system of claim 5, wherein deleting the cache region comprises automatically deleting the cache region when all cache items in the cache region have been deleted.

10. The computer system of claim 5, wherein the cache is spread across a plurality of computer machines and the acts further comprise co-locating the entire cache region in one of the plurality of machines.

11. The computer system of claim 5, wherein the cache is spread across a plurality of cache nodes and the acts further comprise co-locating the entire cache region in one of the plurality of nodes.

12. One or more computer-readable storage media having computer-executable instructions embodied thereon that, when executed, perform acts comprising:
creating a cache in a cache system;
creating a cache region in the cache;
storing a plurality of cache items in the cache region;
receiving a cache region operation request from an application, the cache region operation request comprising an identifier corresponding to the cache region, and the cache region operation request comprising a request version identifier; and
operating on the cache region in response to the cache region operation request, operating on the cache region comprising comparing the request version identifier with a region version identifier associated with the cache region, and operating on the cache region comprising operating on the cache region if the request version identifier matches the region version identifier.

13. The one or more computer-readable media of claim 12, wherein the cache is a distributed partitioned cache.

14. The one or more computer-readable media of claim 12, wherein the cache region operation request comprises a bulk write request that includes a plurality of identified cache items to be stored in the region, and wherein operating on the cache region comprises storing the plurality of identified cache items in the region.

15. The one or more computer-readable media of claim 12, wherein the cache region operation request comprises a request to delete the region, and wherein operating on the cache region comprises deleting the region.

16. The one or more computer-readable media of claim 12, wherein the cache includes a replica of the cache region, the cache region operation request comprises a request to delete the cache region, and wherein operating on the cache region comprises deleting the cache region and the replica of the cache region.

17. The one or more computer-readable media of claim 12, wherein the cache region operation request comprises a get request, and wherein operating on the cache region comprises sending the cache items in the cache region to the application.

18. The one or more computer-readable media of claim 12, wherein the cache region operation request comprises a request to store metadata corresponding to the region in a persistent state, and wherein operating on the cache region comprises storing the metadata in a persistent state.

19. The one or more computer-readable media of claim 12, wherein the cache region operation request comprises a request to replace one or more items in the region, and wherein operating on the cache region comprises locking the entire region and replacing the one or more items.

* * * * *